(12) United States Patent
Lopera et al.

(10) Patent No.: US 10,101,184 B2
(45) Date of Patent: Oct. 16, 2018

(54) VORTEX FLOWMETER FOR USE IN HARSH ENVIRONMENTS

(71) Applicant: Invensys Systems, Inc., Foxboro, MA (US)

(72) Inventors: Javier Lopera, Quincy, MA (US); Wayne A. Dessert, Rehoboth, MA (US)

(73) Assignee: Schneider Electric Systems USA, Inc., Foxboro, MA (US)

( * ) Notice: Subject to any disclaimer, the term of this patent is extended or adjusted under 35 U.S.C. 154(b) by 0 days.

(21) Appl. No.: 15/344,171

(22) Filed: Nov. 4, 2016

(65) Prior Publication Data

US 2018/0128659 A1    May 10, 2018

(51) Int. Cl.
*G01F 1/32* (2006.01)
*G01F 15/00* (2006.01)

(52) U.S. Cl.
CPC .......... *G01F 1/3218* (2013.01); *G01F 1/3254* (2013.01); *G01F 15/006* (2013.01)

(58) Field of Classification Search
CPC ..................................... G01F 1/32; G01F 1/46
See application file for complete search history.

(56) References Cited

U.S. PATENT DOCUMENTS

| 4,116,059 | A | 9/1978 | Herzl |
| 4,732,364 | A | 3/1988 | Seger et al. |
| 4,884,458 | A | 12/1989 | Lew |
| 7,308,832 | B1* | 12/2007 | Ifft .............. G01F 1/28 73/861.24 |
| 2008/0053243 | A1 | 3/2008 | Kimball et al. |
| 2010/0018323 | A1* | 1/2010 | Cheng ............ G01F 1/3218 73/861.24 |
| 2010/0206420 | A1 | 8/2010 | Jakobsen |
| 2014/0260658 | A1 | 9/2014 | Strom et al. |
| 2017/0199063 | A1* | 7/2017 | Gordon ............ G01F 1/46 |

OTHER PUBLICATIONS

Extended European Search Report for 17197175.7, dated Mar. 19, 2018.

* cited by examiner

*Primary Examiner* — Jewel V Dowtin
(74) *Attorney, Agent, or Firm* — Senniger Powers

(57) ABSTRACT

A vortex meter for measuring a flow rate of a fluid has a flowtube and a bluff body positioned in the flowtube for shedding vortices in the fluid when the fluid flows through the flowtube. The vortex meter has a sensor positioned to detect the vortices. The bluff body has a forward-facing surface and an abrasion-resistant cladding covering the forward facing surface. The bluff body suitably also has a projection extending downstream from the forward-facing surface. The bluff body suitably has an abrasion-resistant cladding covering at least a portion of the projection. In one embodiment, the entire bluff body is completely covered by the abrasion-resistant cladding. The inner surface of a segment of the flowtube can also have abrasion-resistant characteristics.

18 Claims, 3 Drawing Sheets

VORTEX FLOWMETER FOR USE IN HARSH ENVIRONMENTS

FIELD

The present invention relates generally to vortex flowmeters and more particularly to vortex flowmeters that measure flow rate of fluids that may have properties that result in a harsh environment inside the flowmeter.

BACKGROUND

Flow meters may measure the rate of flow of a fluid in a pipe or other pathway. The fluid may be, for example, a gas or a liquid, and may be compressible or incompressible. One type of flow meter is a vortex flow meter which measures parameters including, for example, flow rate based on the principle of vortex shedding. Vortex shedding refers to a natural process in which a fluid passing a bluff body (sometimes referred to as a shedder) causes a boundary layer of slowly moving fluid to be formed along the surface of the bluff body. A low pressure area is created behind the bluff body and causes the boundary layer to roll up, which generates vortices in succession on opposite sides of the bluff body. The vortices induce pressure variations that may be sensed by a pressure sensor. The vortex-shedding pressure variations have a frequency that is related to the flow rate. Accordingly, by measuring the frequency of the pressure variations, the flow rate may be determined.

Vortex flow meters provide vortex frequency data that can be used in conjunction with flow calibration factors determine the velocity and volumetric flow rate of the fluid passing through the meter. With inputted fluid density values, the mass flow rate can also be computed. These measurements, and others, can be transmitted to a control room or other receiver over a communication line, such as, for example, a standard two-wire 4-20 milliamp ("mA") transmission line.

In some applications (e.g., in the oil and gas, mining, chemical, and waste industries), the fluid flow monitored by a vortex flowmeter may sometimes include sand, minerals, or other abrasive particles. Over time, abrasive fluid flow can erode the bluff body, the inner the surface of the conduit containing the bluff body, and/or other features of a vortex flowmeter. The calibration factors used in the conversion of vortex shedding frequency to volumetric flow rate are based on the initial physical configuration of the bluff body and other parts of the vortex flowmeter. Erosion of these structures by abrasive fluids introduces error in the flowmeter. Thus, abrasive fluids can reduce the life of a vortex flowmeter.

The present inventors have developed systems and methods, described in detail below, that improve the ability operate a vortex flow meter with fluids that contain abrasive particles.

SUMMARY

One aspect of the invention is a vortex meter for measuring a flow rate of a fluid. The vortex meter has a flowtube and a bluff body positioned in the flowtube for shedding vortices in the fluid when the fluid flows through the flowtube. A sensor is positioned to detect the vortices. The bluff body has a forward-facing surface and an abrasion-resistant cladding covering the forward facing surface.

Another aspect of the invention is a vortex meter for measuring a flow rate of a fluid. The vortex meter has a flowtube and a bluff body positioned in the flowtube for shedding vortices in the fluid when the fluid flows through the flowtube. A sensor is positioned to detect the vortices. The bluff body has a forward-facing surface and a projection extending downstream from the forward-facing surface. The forward-facing surface has a width that is wider than a width of the projection. The bluff body has an abrasion-resistant cladding covering at least a portion of the projection.

Still another aspect of the invention is a vortex meter for measuring a flow rate of a fluid. The vortex meter has a flowtube and a metal bluff body positioned in the flowtube for shedding vortices in the fluid when the fluid flows through the flowtube. A sensor is positioned to detect the vortices. The metal bluff body has a core made of a relatively softer material and an abrasion-resistant metal cladding covering at least a portion of the core. The abrasion-resistant metal cladding having a hardness that exceeds the hardness of the core.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
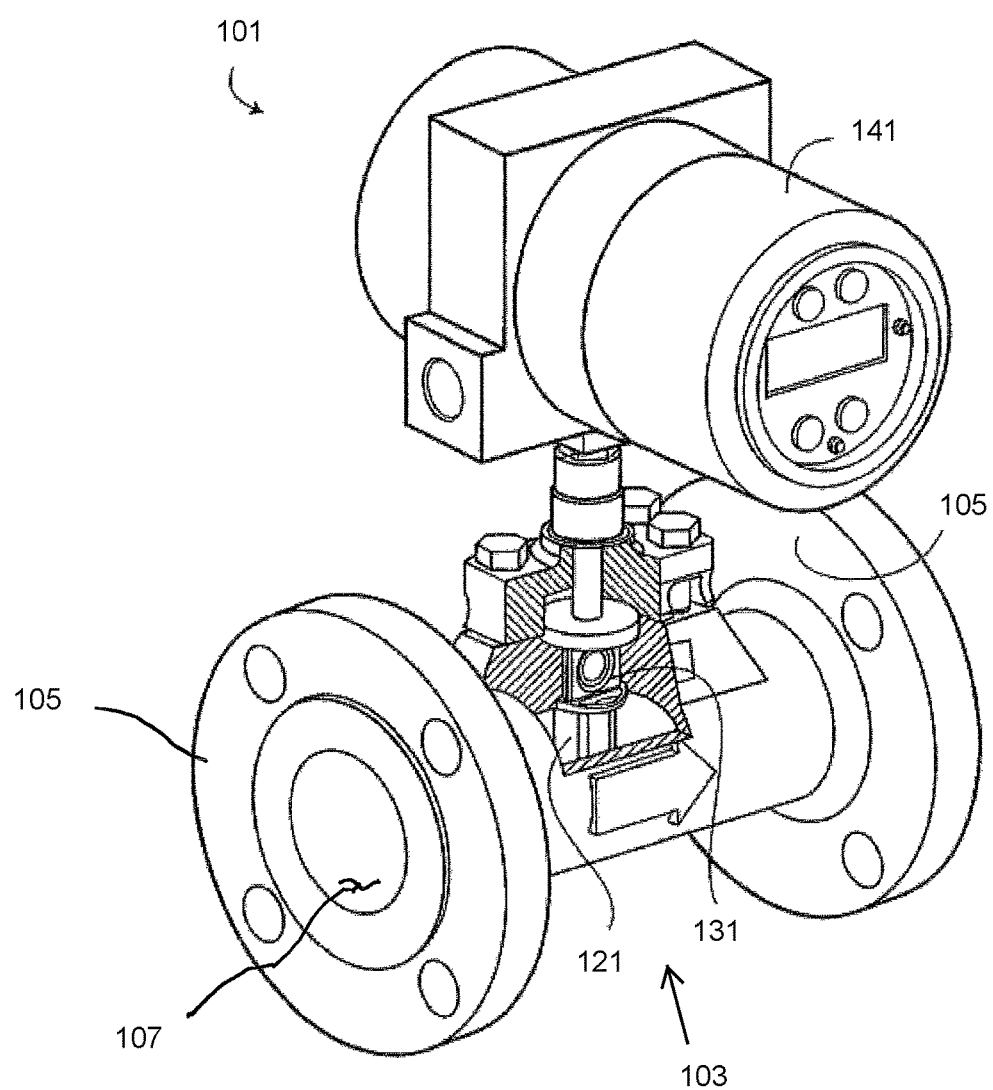
FIG. 1 is a perspective of one embodiment of a vortex meter with a portion of a flowtube thereof removed to show internal features.

Referring now to the drawings, first to FIG. 1, one embodiment of a vortex meter for measuring fluid flow rate is generally designated 101. The vortex meter 101 includes a flowtube 103 through which a fluid can flow. The flowtube 103 is suitably configured for installation in a fluid flow line (not shown). For example, process connections 105 (e.g., flanges) are on the opposite ends of the flowtube 103 for connecting the inlet 107 and outlet 109 of the flowtube to the ends of pipes in a pipeline. It is also common in the industry to use a so-called wafer connection (or "sandwich connection") to install a flowmeter in a fluid line and the flowtube can be adapted for a wafer connection (or any other type of connection) if desired. Other types of connections can also be used without departing from the scope of the invention.

A bluff body 121 (sometimes referred to in the industry as a vortex shedder or shedder bar) is positioned in the flowtube 103. The bluff body 121 is a structure that partially obstructs fluid flow through the flowtube 103 for the purpose of generating vortices in the fluid when the fluid flows through the flowtube. The frequency of the vortices is proportional to the velocity of the fluid for a relatively wide range of flow conditions. Because the cross sectional flow area of the flowtube 103 is constant, the frequency of vortices is also proportional to the volumetric flow rate. This phenomenon is well known to those skilled in the art and need not be discussed in detail. Moreover, if the density of the fluid is known or measured, the mass flow rate can be derived from the volumetric flow rate.

Figure 2:
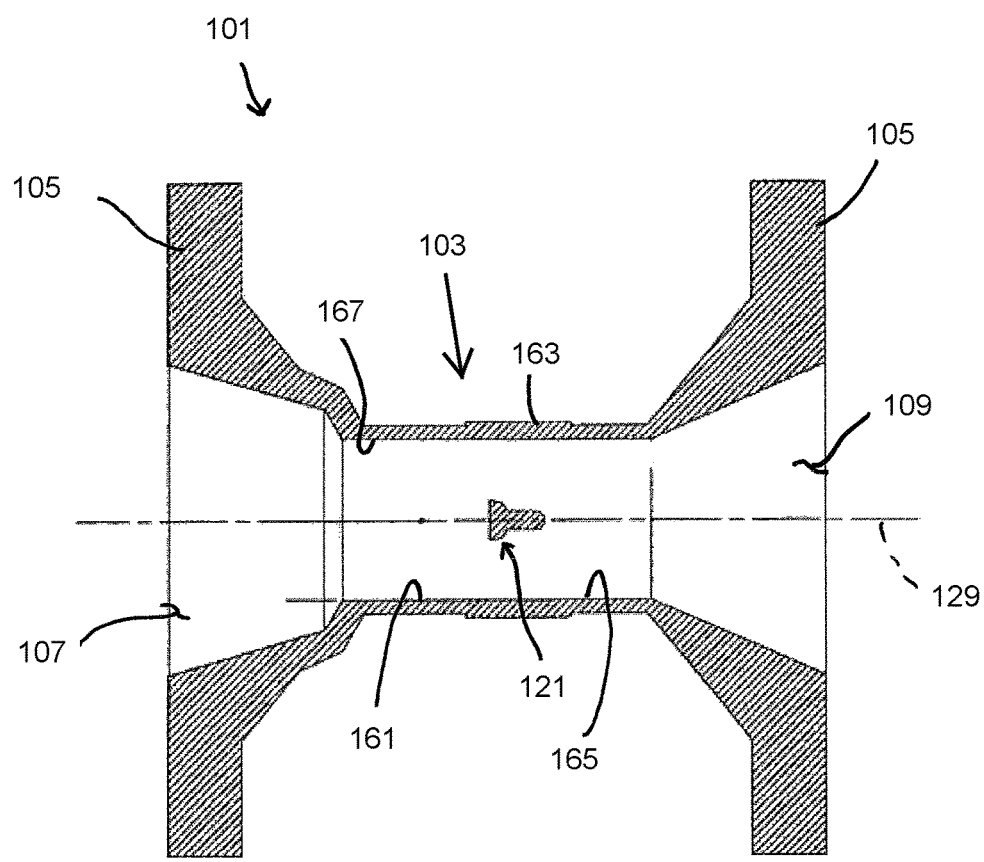
FIG. 2 is a cross section of the flowtube taken in a horizontal plane containing a central axis of the flowtube showing the lower portion of the flowtube.
Figure 3:
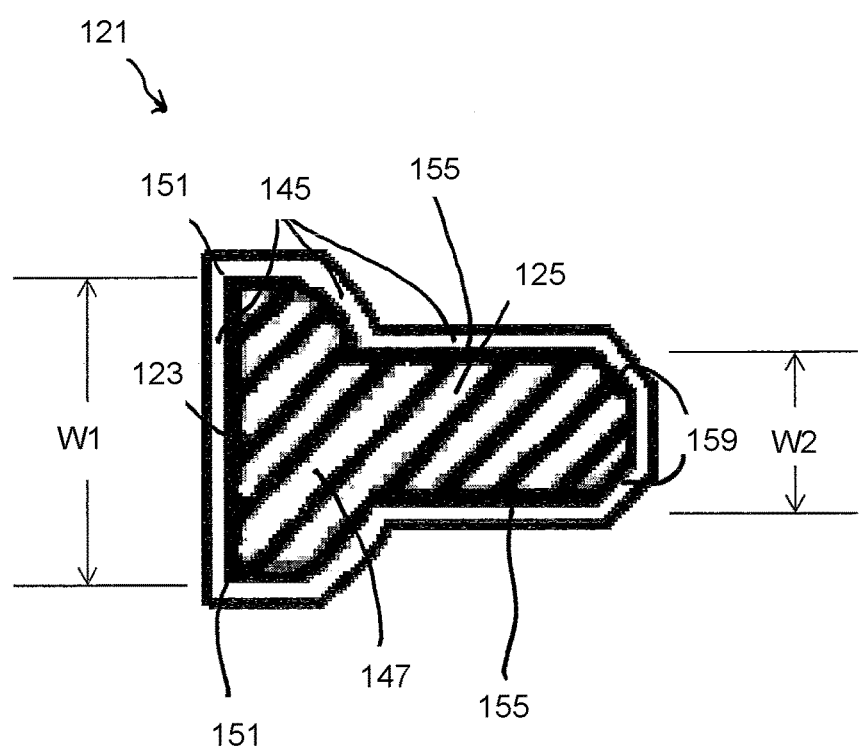
FIG. 3 is an enlarged schematic top view of one embodiment of a bluff body having abrasion-resistant cladding.

Broadly speaking, the bluff body can have any configuration as long as it is able to generate vortices in a fluid stream flowing past the bluff body. In the illustrated embodiment, the bluff body 121 is a substantially rigid structure having its ends affixed to the flowtube 103 to minimize movement of the bluff body in response to pressure fluctuations associated with vortices formed by the bluff body. However, the bluff body can be designed to flex or otherwise move in response to the pressure fluctuations associated with the vortices if desired. Referring to FIGS. 2 and 3, the bluff body 121 in the illustrated embodiment has forward-facing surface 123 that is substantially flat. The flat forward-facing surface 123 is oriented generally perpendicularly to the overall direction of flow through the flowtube 103. The bluff body 121 also has a projection 125 oriented to extend downstream from the forward-facing surface 123. The projection 125 suitably extends generally perpendicularly to the forward-facing surface 123 of the bluff body 121. The forward-facing surface 123 has a width W1 that is wider than the width W2 of the projection 125. The projection 125 is also generally parallel to the central axis 129 of the flow tube. For example, the projection 125 can be aligned with the central axis 129 of the flowtube, as illustrated in FIG. 2. The projection 125 gives the bluff body 121 a T-shaped cross-section. The projection 125 functions as a flow splitter that prolongs separation of the fluid on opposite sides of the bluff body. One desirable effect of the projection 125 is that it can increase regularity of vortex shedding, and in particular increase linearity of the correlation between the vortex shedding frequency and the fluid flow rate. The cross sectional shape of the bluff body 121 illustrated in FIGS. 2 and 3 is just one example of a suitable shape for a bluff body. Other non-limiting examples of shapes that are suitable for the cross sectional shape of the bluff body include rectangular, trapezoidal, circular, diamond, and triangular. A flow splitting projection can be included on any of these shapes. Other examples can be found, for example, in U.S. Pat. No. 4,464,939, the contents of which are hereby incorporated by reference.

The vortex meter 101 includes a sensor 131 positioned to detect vortices generated by the bluff body 121. As illustrated, the sensor 131 is suitably positioned in a well 133 in the flowtube at the top of the bluff body 121. In this embodiment, the sensor 131 is in direct contact with fluid flowing through the flowtube 103. This allows the sensor 131 to sense vortices directly. However, it is contemplated that the sensor can be positioned to sense vortices indirectly, such as by detecting movement of a bluff body or other structure that is designed to flex or otherwise move in response to pressure fluctuations associated with the vortices formed in the fluid. In the illustrated embodiment, the sensor 131 is a differential pressure sensor. It is understood that the sensor 131 can be positioned elsewhere within the scope of the invention, such as on the bluff body or downstream of the bluff body. It is also understood that any type of sensor that is able to detect the vortices formed by the bluff body can be used.

The vortex meter 101 includes a transmitter 141 that receives signals from the sensor 131 indicative of the frequency of vortex formation. The transmitter 141 includes a processor or circuitry (not shown) configured to output a measurement signal indicative of fluid flow rate through the flowtube 103 based on the signals from the sensor 131. For example, the transmitter 141 can be configured to communicate with a distributed control system using 4-20 mA, HART, Foundation Fieldbus, or any other communication protocol.

The fluid carried by the pipeline may be a liquid, a gas, or a mixture of liquid and gas. The fluid may also contain solid particles, such as sand, dirt, dust, metal shavings, etc. that have the capacity to erode materials that are exposed to the abrasive fluid. The bluff body 121 includes an abrasion-resistant cladding 145 to protect the bluff body from erosion or abrasion. The bluff body 121 has a metal core made of a material that is softer than the material of the abrasion resistant cladding. For example, the hardness of the cladding 145 is suitably in the range of about 50 to about 80 HRC (measured according to ASTM E18-16 Standard Test Methods for Rockwell Hardness of Metallic Materials, while the core of the bluff body has a hardness that is less than about 50 HRC. The surface finish of the cladding is suitably in the range of about 63 to 125 Ra. The core 147 of the bluff body 121 is suitably made of stainless steel, Haselloy®-C, Duplex Stainless Steel, other high-nickel alloys, carbon steel, precipitation hardened stainless steel and the like. The abrasion-resistant cladding 145 can be secured to the core 147 of the bluff body by welding, metal spraying, brazing, other thermal attachment techniques, etc. The abrasion-resistant cladding 145 can be made of a harder or hardened version of the same or similar type of material as the core 147 of the bluff body 121 or the cladding and core of the bluff body can be made of different materials.

The abrasion-resistant cladding 145 suitably protects portions of the bluff body 121 that are particularly vulnerable to erosion due to interaction of the bluff body with the flowing fluid and/or the effects of vortices formed by the bluff body. The abrasion-resistant cladding 145 also protects parts of the bluff body 121 that have a significant impact on optimal vortex formation. The forward-facing surface 123 faces into the fluid stream, which can increase the likelihood of impact between the forward-facing surface and potentially abrasive particles contained in the fluid. The forward-facing corners 151 of the bluff body 121 are also very important to optimal vortex formation because vortex shedding is initiated at these edges and the desire for a linear vortex measurement is to "fix" the separation point for the boundary layer before the vortex roll up. Accordingly, the abrasion-resistant cladding 145 in the illustrated embodiment covers (e.g., extends continuously over the entirety of) the forward-facing surface 123 of the bluff body 121. Moreover, the abrasion-resistant cladding 145 extends at least some distance downstream from the forward-facing corners 151 to help maintain sharp edges at the front of the bluff body 121.

The abrasion-resistant cladding 145 also covers at least a portion of the flow-splitting projection 125. For example, as illustrated the abrasion-resistant cladding 145 covers at least a portion of each side 155 of the flow-splitting projection 125. The abrasion-resistant cladding 145 suitably covers at least portions of the inwardly-tapering sides 159 at the tail end of the flow-splitting projection 125.

In the illustrated embodiment, the entire exterior surface of the bluff body 121 is covered by the abrasion-resistant cladding 145. However, this may not be necessary. It is possible to use the cladding on one or more targeted areas, such as the forward-facing surface of the bluff body and/or the trailing portion of the flow-splitting projection, while leaving other portions of the bluff body uncovered by the cladding. For example, certain portions of the bluff body may frequently be exposed to localized stagnant flow and it may be desirable to omit cladding over these areas to reduce the cost associated with the cladding.

Abrasive material in the flowing liquid may also cause erosion of the inner surfaces 161 of the flowtube 103, which could impair performance of the meter. This problem can be heightened by the swirling motion in the fluid associated with the vortices downstream of the bluff body. Although it is possible to use abrasion-resistant cladding on the inner surfaces of the flowtube, this would present a problem because the front edge of the cladding would be exposed to the fluid flow and create undesirable drag. Also, the abrupt change in diameter of the flowtube would also create turbulence in the fluid flow which may impair operation of the meter. In the illustrated embodiment, one or more portions 165 of the inner surfaces 161 of the flowtube sidewall 163 are treated with a hardening treatment to make the metal in that portion of the flowtube more resistant to abrasion. Suitable hardening treatments for the flowtube sidewall 163 include, but are not limited to, flame spray, plasma-transferred arc overlays, rapid-arc overlays, oxy-acetylene overlays, spray-fuse facing, plasma-arc spray, high-velocity coatings, plasma-PTA technology, plasma hardfacing, PTA pipe hardfacing, and the like. The treated areas 165 suitably have a hardness that exceeds the hardness of the untreated portions 167 of the inner surface 161 of the flowtube 103.

In the illustrated embodiment, there is a single area 165 treated for hardness and this area covers substantially the entire inner surface 161 of a segment of the flowtube 103 extending downstream from the bluff body. For example, the area 165 treated for hardness suitably extends from about ¼ pipe diameter upstream of the bluff body 121 to about ¼ pipe diameter downstream of the bluff body, and more suitably from about ½ pipe diameter upstream of the bluff body 121 to about ½ pipe diameter downstream of the bluff body. For some applications it may be desirable for the hardened area 165 of the inner surface 161 to extend substantially continuously all the way between the process connections 105.

The operation of the flowmeter 101 is substantially identical to a conventional vortex meter except as noted. During use of the meter 101 to measure flow rate of fluid, the bluff body 121 is protected to some degree against erosion by abrasive particles by the abrasion-resistant cladding 145. Likewise, any portions 165 of the inner surface 161 of the flowtube 103 that have been hardened by the hardness treatment are also protected to some degree against erosion. This extends the useful life of the flowmeter 101, especially when it is used with abrasive fluids.

When introducing elements of the present invention of the preferred embodiments thereof, the articles "a", "an", "the", and "said" are intended to mean that there are one or more of the elements. The terms "comprising", "including", and "having" are intended to be inclusive and mean that there may be additional elements other than the listed elements.

In view of the foregoing, it will be seen that the several objects of the invention are achieved and other advantageous results attained.

As various changes could be made in the above constructions without departing from the scope of the invention, it is intended that all matter contained in the above description and shown in the accompanying drawings shall be interpreted as illustrative and not in a limiting sense.

The invention claimed is:

1. A vortex meter for measuring a flow rate of a fluid, the vortex meter comprising:
   a flowtube;
   a bluff body positioned in the flowtube for shedding vortices in the fluid when the fluid flows through the flowtube; and
   a sensor positioned to detect the vortices,
   wherein the bluff body has a forward-facing surface and an abrasion-resistant cladding covering the forward-facing surface.

2. A vortex meter as set forth in claim 1 wherein the forward-facing surface is substantially flat and is oriented generally perpendicular to the overall direction of flow through the flowtube.

3. A vortex meter as set forth in claim 2 wherein the abrasion-resistant cladding extends continuously over the entirety of the forward-facing surface.

4. A vortex meter as set forth in claim 1 wherein the bluff body further comprises a projection extending downstream from the forward-facing surface, the forward-facing surface having a width that is wider than a width of the projection, and wherein the bluff body further comprises an abrasion-resistant cladding covering at least a portion of the projection.

5. A vortex meter as set forth in claim 4 wherein the projection comprises a flow splitter.

6. A vortex meter as set forth in claim 4 wherein the projection has sides positioned behind the forward-facing surface and the abrasion-resistant cladding covers at least a portion of each side of the projection.

7. A vortex meter as set forth in claim 4 wherein the projection has a trailing end having inwardly tapered sides and the abrasion-resistant cladding covers at least portions of the tapered sides.

8. A vortex meter as set forth in claim 4 wherein the bluff body has a T-shaped cross-sectional shape.

9. A vortex mater as set forth in claim 1 wherein the flowtube has an inner surface and at least a portion of the inner surface has a hardness that exceeds the hardness of a base material used to make the flowtube to protect the inner surface of the flowtube against abrasion associated with the vortices.

10. A vortex meter as set forth in claim 1 wherein the forward-facing surface of the bluff body is made of a relatively softer material and the abrasion-resistant cladding is made of a relatively harder material.

11. A vortex meter as set forth in claim 1 wherein the forward-facing surface of the bluff body and the abrasion-resistant cladding each comprise metal.

12. A vortex meter for measuring a flow rate of a fluid, the vortex meter comprising:
    a flowtube;
    a bluff body positioned in the flowtube for shedding vortices in the fluid when the fluid flows through the flowtube; and
    a sensor positioned to detect the vortices,
    wherein the bluff body has a forward-facing surface, a projection extending downstream from the forward-facing surface, the forward-facing surface having a width that is wider than a width of the projection, and wherein the bluff body further comprises an abrasion-resistant cladding covering at least a portion of the projection.

13. A vortex meter as set forth in claim 12 wherein the projection comprises a flow splitter.

14. A vortex meter as set forth in claim 12 wherein the projection has sides positioned behind the forward-facing surface and the abrasion-resistant cladding covers at least a portion of each side of the projection.

15. A vortex meter as set forth in claim 12 wherein the projection has a trailing end having inwardly tapered sides and the abrasion-resistant cladding covers at least portions of the inwardly tapered sides.

16. A vortex meter as set forth in claim 12 wherein the bluff body has a T-shaped cross-sectional shape.

17. A vortex meter for measuring a flow rate of a fluid, the vortex meter comprising:

a flowtube;

a metal bluff body positioned in the flowtube for shedding vortices in the fluid when the fluid flows through the flowtube; and a sensor positioned to detect the vortices, wherein the metal bluff body has a core made of a relatively softer material and an abrasion-resistant metal cladding covering at least a portion of the core, the abrasion-resistant metal cladding having a hardness that exceeds the hardness of the core.

18. A vortex meter as set forth in claim 17 wherein the flowtube has an inner surface and at least a portion of the inner surface has a hardness that exceeds the hardness of a base material used to make the flowtube to protect the inner surface of the flowtube against abrasion associated with the vortices.

\* \* \* \* \*